US010897920B1

(12) United States Patent
     Guoin

(10) Patent No.: US 10,897,920 B1
(45) Date of Patent: *Jan. 26, 2021

(54) SELF-CONTAINED WATER SYSTEM

(71) Applicant: PERFECT WATER WORLDWIDE, LLC, Montecito, CA (US)

(72) Inventor: Kenneth J. Guoin, Santa Barbara, CA (US)

(73) Assignee: PERFECT WATER WORLDWIDE, LLC, Montecito, CA (US)

(*) Notice: Subject to any disclaimer, the term of this patent is extended or adjusted under 35 U.S.C. 154(b) by 671 days.

This patent is subject to a terminal disclaimer.

(21) Appl. No.: 15/727,217

(22) Filed: Oct. 6, 2017

(51) Int. Cl.
| C02F 9/00 | (2006.01) |
| A61K 9/00 | (2006.01) |
| C01B 5/00 | (2006.01) |
| C02F 1/78 | (2006.01) |
| A23L 2/74 | (2006.01) |
| C02F 1/44 | (2006.01) |
| B01D 61/08 | (2006.01) |

(Continued)

(52) U.S. Cl.
CPC .............. *A23L 2/74* (2013.01); *B01D 61/08* (2013.01); *C02F 1/32* (2013.01); *C02F 1/441* (2013.01); *C02F 5/083* (2013.01)

(58) Field of Classification Search
CPC .......... A23L 2/74; A61K 9/00; A61K 9/0014; A61K 33/00; B01D 61/08; C01B 5/00; C02F 1/32; C02F 1/441; C02F 1/78; C02F 1/44; C02F 1/42; C02F 5/083; C02F 9/00
USPC .......................................................... 210/143
See application file for complete search history.

(56) References Cited

U.S. PATENT DOCUMENTS 2,907,174 A  10/1959 Hendal
4,230,571 A  10/1980 Dadd
(Continued)

FOREIGN PATENT DOCUMENTS

CN  203606310 U  5/2014

OTHER PUBLICATIONS

Briganti, S., et al., "Antioxidant Activity, Lipid Peroxidation and Skin Diseases. What's New," The Journal of the European Academy of Dermatology and Venereology, 17 (6).Oct. 2003. 1 Page. Abstract Only.

(Continued)

Primary Examiner — Robert Clemente
Assistant Examiner — Akash K Varma
(74) Attorney, Agent, or Firm — Steinfl + Bruno LLP

(57) ABSTRACT

A self-contained water system that provides single point water delivery is presented. The self-contained water system purifies incoming water and restructures the purified water to deliver pure, alkaline, ionized, mineral-rich water. A first stage purification of water may be performed via pre-filtering and reverse osmosis stages that sequentially remove larger and smaller particles in the water prior to storing first stage purified water into a holding tank. A second stage purification of water is performed via a closed loop purification system that sanitizes water in the holding tank so as to kill microorganisms in the water. Restructuring of the purified water in the holding tank is performed via a water conditioner stage that remineralizes the water prior to providing for end use. Water in the holding tank can be oxygenized via a vortexing device that operates on the water in the holding tank in a closed loop fashion.

20 Claims, 12 Drawing Sheets

(51) Int. Cl.
C02F 5/08 (2006.01)
C02F 1/32 (2006.01)

(56) References Cited

U.S. PATENT DOCUMENTS

| | | | |
|---|---|---|---|
| 5,431,810 | A | 7/1995 | Russo et al. |
| 5,858,430 | A | 1/1999 | Endico |
| 6,063,295 | A | 5/2000 | Williams et al. |
| 6,284,293 | B1* | 9/2001 | Crandall ............... C02F 9/00 205/751 |
| 6,386,751 | B1 | 5/2002 | Wootan et al. |
| 6,521,248 | B1 | 2/2003 | Holloway et al. |
| 7,806,584 | B2 | 10/2010 | Wootan et al. |
| 8,550,696 | B2 | 10/2013 | Ebers et al. |
| 8,771,524 | B2 | 7/2014 | Vorage et al. |
| 10,626,036 | B1 | 4/2020 | Guoin |
| 2007/0286795 | A1 | 12/2007 | Chiba et al. |
| 2012/0085687 | A1 | 4/2012 | Simonette |
| 2013/0041312 | A1 | 2/2013 | Eckert |
| 2014/0166498 | A1* | 6/2014 | Orolin ................ C02F 1/441 205/743 |
| 2017/0203986 | A1* | 7/2017 | Ervin ................... C02F 9/00 |

OTHER PUBLICATIONS

Dhar, A., et al., "The role of AP-1, NF-κB and ROS/NOS in skin carcinogenesis: The JB6 model is predictive," Mol and Cellular Biochem vol. 234(1):185-93. May 2002. 1 Page. Abstract Only.

Ernstene, C., et al., "Cutaneous Respiration in Man," J Clin Invest. May 1, 1932;11(2):387-390. 5 Pages.

Fitzgerald, L.R., et al., "Cutaneous respiration in man," Physiological Reviews vol. 37(3):325-345.Jul. 1, 1957.3 Pages. First Page Only.

Gruber, R.P., et al., "Skin Permeability to Oxygen and Hyperbaric Oxygen," Arch Surg. 101(1):69-70. Jul. 1970. 1 Page. Abstract Only.

Kaqun: The Element Kaqun STUDIES 2004-2013, 2nd Edition. Budapest, 2013. 183 Pages.

Kotecha, R., et al, "Oxygen treatment attenuates systemic inflammation via cholinergic pathways," Journal of surgical Research vol. 181(1):71-73. Mar. 28, 2012. 1 Page. Abstract Only.

Non-Final Office Action for U.S. Appl. No. 15/727,470, filed Oct. 6, 2017 on behalf of Perfect Water Worldwide, LLC. dated Jan. 22, 2020. 15 pages.

Notice of Allowance for U.S. Appl. No. 15/727,560, filed Oct. 6, 2017 on behalf of Perfect Water Worldwide, LLC. dated Feb. 13, 2020. 13 pages.

Scheuplein, R.J., et al., "Permeability of the Skin," Psychological Reviews vol. 51(4): 702-47. Oct. 1971. 1Page. Introduction Only.

Barret, S., FTC Attacks 'Stabilized Oxygen Claims,' accessed at https://www.quackwatch.org/04ConsumerEducation/News/vitamino.html May 2000. 3 pages.

Bickers, D.R., et al., "Oxidative Stress in the Pathogenesis of Skin Disease," Journal of Investigative Dermatology vol. 126(12):2465-75.Jan. 2006. 11 Pages.

Bunkin., N.F., et al., "Structure of the Nanobubble Clusters of Dissolved air in Liquid Media," J Biol Phys. vol. 38(1):121-52. Jan. 2012. 32 Pages.

Cameron., R., "Tiny Bubbles" ACCJ Journal, pp. 35-37.Jun. 2005.3 Pages.

Chaplin., M., "Water Structure and Science: Nanobubbles (ultrafine bubbles)," accessed at http://www1.lsbu.ac.uk/water/nanobubble.html. Jan. 2007. 13 Pages.

Chougule, S.S., et al., "Comparative Study on Heat Transfer Enhancement of Low Volume Concentration of AL2O3—Water and Carbon Water Nanotube—Water Nanofluids in Laminar Regime Using Helical Screw Tape Inserts,"*Exp. Heat Transfer*, vol. 28(1) pp. 17-36.Aug. 2015. 21 Pages.

Connor, M.J., et al., "Depletion of Cutaneous Glutathione by Ultraviolet Radiation," *Photochemistry and Photobiology* vol. 46(2). pp. 239-245. Aug. 1987. 7 Pages.

Duntas, L.H., et al., "Selenium and Inflammation—Potential Use and Future Perspectives" US Endocrinology, 11:97-102. Jan. 2015. 6 Pages.

Harch, P.G., "Hyperbaric oxygen in chronic traumatic brain injury: oxygen, pressure, and gene therapy." Medical Gas Research vol. 5(9). Jul. 14, 2015. 4 pages.

IDEC, "What are Ultrafine Bubble," Website accessed at<https://www.idec.com/home/finebubble/bubble01.html>Jan. 2017. 3 pages.

Kim, A.L. et al., "Role of p38 MAPK in UVB-Induced Inflammatory Responses in the Skin of SKH-1 Hairless Mice," Journal of Investigative Dermatology vol. 124(6):1318-25.Jun. 2005. 8 Pages.

Lee, Y.S., et al., "Long Course Hyperbaric Oxygen Stimulates Neurogenesis and Attenuates Inflammation after Ischemic Stroke," Mediators of Inflammation vol. 2013, Article ID 512978, 13 pages. Jan. 2013. 14 Pages.

Li, H., et al., "Antagonistic Effects of P53 and HIF1A on MicroRNA-34—a Regulation of PPP1R11 and STAT3 and Hypoxia-induced Epithelial to Mesenchymal Transition in Colorectal Cancer Cells," American Gastroenterological Association vol. 153(2): 505-20. Aug. 2017. 17 pages.

Lower, S., "H2O: A Gentle Introduction to Water and its Structure," accessed at<http://www.chem1.com/acad/sci/aboutwater.html> on Sep. 5, 2019. 15 Pages.

Ludwig-Maximilians-Universität München. "Cancer Metastasis: The unexpected perils of hypoxia." ScienceDaily, May 11, 2017, Accessed at https://www.sciencedaily.com/releases/2017/05/170511113523.htm. 5 Pages.

Mayo Clinic. "Skin cancer on the rise." ScienceDaily, May 15, 2017. Accessed at http://www.sciencedaily.com/releases/2017/05/170515141000.htm>. 5 Pages.

McColl, A., et al., "TLR7-mediated skin inflammation remotely triggers chemokine expression and leukocyte accumulation in the brain," Journal of Neuroinflammation vol. 13 (102). May 2016. 16 Pages.

"Naneau: Breathing Life into Water," 2019 Website. Accessed at http://www.inspiredwaters.com/ on Sep. 2019. 11 Pages.

"Naneau O2 Water," Jan. 2019 Marketing materials by Naneau. 26 Pages.

Naneau Oxygen Nanobubbles Website: Home page, About Naneau, and the Science behind Naneau. Accessed from https://naneauhealth.com/ on Nov. 21, 2019. 26 Pages.

Non-Final Office Action for U.S. Appl. No. 15/727,560, filed Oct. 6, 2017 on behalf of Perfect Water Worldwide, LLC. dated Aug. 21, 2019. 21 Pages.

Pansky, B., "Review of Medical Embryology Book, Chapter 25: Germ Layers and their Derivatives," accessed at https://discovery.lifemapsc.com/library/review-of-medical-embryology/chapter-25-germ-layers-and-their-derivatives_on Sep. 5, 2019. 2 Pages.

Reelfs, O., et al., "Ultraviolet a Radiation-Induced Immediate Iron Release Is a Key Modulator of the Activation of NF-κB in Human Skin Fibroblasts," Journal of Investigative Dermatology vol. 122(6):1440-47. Jun. 2004. 8 Pages.

Restriction Requirement for U.S. Appl. No. 15/727,470, filed Oct. 6, 2017 on behalf of Perfect Water Worldwide, LLC. dated Oct. 28, 2019. 6 pages.

Restriction Requirement for U.S. Appl. No. 15/727,560, filed Oct. 6, 2017, on behalf of Perfect Water Worldwide LLC. dated Jan. 2, 2019. 9 pages.

Scheuplein, R.J., "Mechanism of Percutaneous Absorption: II. Transient Diffusion and the Relative Importance of Various Routes of Skin Penetration," Journal of Investigative Dermatology vol. 48(1): 79-88.Jan. 1967. 10 pages.

"State of the Air 2016," Report by the American Lung Association, accessed at<http://www.lung.org/assets/documents/healthy-air/state-of-the-air/sota-2016-full.pdf in Jan. 2016. 157 Pages.

Xi., C., et al., "Reduction of Ammonia Emission in Chicken Farms by Improved Water Systems," Jan. 2011. Accessed from <http://www.inspiredwaters.com/naneau-science-studies/ on Sep. 2019. 2 Pages.

(56) References Cited

OTHER PUBLICATIONS

Yurchenko., S.O., et al., "Ion-Specific and Thermal Effects in the Stabilization of the Gas Nanobubble Phase in Bulk Aqueous Electrolyte Solutions," Langmuir 32 (43):11245-11255.Jun. 2016. 12 Pages.

Zhang, Q., et al., "Hyperbaric Oxygen Attenuates Apoptosis and Decreases Inflammation in an Ischemic Wound Model," J Invest Dermatol, 128(8):2102-12.Mar. 2008. 11 Pages.

Zhao, B., et al., "Hyperbaric oxygen attenuates neuropathic pain and reverses inflammatory signaling likely via the Kindlin-1/Wnt-10a signaling pathway in the chronic pain injury model in rats," J Headache Pain, 18(1).Jan. 5, 2017. 8 Pages.

Battino, R., T.R. Rettich, and T. Tominaga, "The solubility of oxygen and ozone in liquids". Journal of physical and chemical reference data, 1983. 12(2): pp. 163-178.

Biocera Catalogue, published by Dr. Jeon Hyoung-Tag, Biocera Co. Ltd., South Korea, accessed on May 13, 2017 at www.biocera.co.kr. 30 pages.

Das, C. and P.D. Olmsted, "The physics of stratum corneum lipid membranes", Philosophical Transactions of the Royal Society, Apr. 2016. 374(2072): pp. 1-17.

Dr. Jeffrey McCombs, "The Physiology of Oxygenated Water". May 2017. 4 pages.

"Dr. Otto Heinrich Warburg Nobel Prize Winner *The Root Cause of Cancer*". 1 page.

Ebina, et al. "Oxygen and Air Nanobubble Water Solution Promote the Growth of Plants, Fishes, and Mice" Osaka University, PLOS One, vol. 8, Issue 6, Jun. 2013. 7 pages.

Eucerin, "Understanding skin", accessed on Jun. 5, 2017 at <http://www.eucerin.sg/about-skin/basic-skin-knowledge/skin-structure-and-function.> 15 pages.

"Hyperbaric oxygen therapy", Mayo Clinic, accessed on May 24, 2017 at <http://www.mayoclinic.org/tests-procedures/hyperbaric-oxygen-therapy/basics/definition/prc-20019167>. Nov. 2014: 3 pages.

Ignatov, I. and O. Mosin, "Structural Mathematical Models Describing Water Clusters". Published by The International Institute for Science, Technology and Education, vol. 3, No. 11, 2013. pp. 72-88.

*Kaqun Hungary Oxygenated Water Research Studies*. "Report about effects of Kaqun water on the speed of cognitive functions"; Kocsis, et al. "Study on the effect of Kaqun water on antioxidant capacity"; Biro, et al. "The effect of KAQUN-water on the immune parameters of healthy volunteers", National Institute of Chemical Safety, Dec. 2009. www.kaqun.sk/en/studies. 5 pages.

Kasai, Y., et al., "The $H_2O-O_2$ water vapour complex in the Earth's atmosphere". Atmospheric Chemistry and Physics, Aug. 2011. 11(16): pp. 8607-8612.

Ladizinsky, D. and D. Roe, "New Insights Into Oxygen Therapy for Wound Healing. Wounds", 2010. 22(12): pp. 294-300.

Lambrechts et al. "Normalizing tumor oxygen supply could be key factor in the fight against cancer", Nature, Aug. 2016. 1 page.

Madagascar Minerals "Rose Quartz Spheres" website, accessed Oct. 16, 2017. Tucson, AZ. 2003-2017. <www.madagascarminerals.com/cat_rose_quartz_spheres1.cfm>.

Potts, R.O. and M.L. Francoeur, "Lipid biophysics of water loss through the skin." Proceedings of the National Academy of Sciences, May 1990. 87(10): p. 3871-3873.

Shimadzu, Application News, Nano Particle Size Analyzer: SALD-7101, No. 4, Downloaded from <http://www.ssi.shimadzu.com/products/literature/testing/microbubbles%nanobubbles%20red.pdf> accessed on Jul. 24, 2017. pp. 1-3.

Spivey, N., "Application Note, Atomic Absorption, Analysis of Major Elements in Drinking Water Using Fast Flame Sample Automation for Increased Sample Throughput". 2015: p. 1-5.

Stillinger, F.H., "Theory and molecular models for water". Adv. Chem. Phys, 1975. 31(1). 101 pages.

Stücker, M., et al., "The cutaneous uptake of atmospheric oxygen contributes significantly to the oxygen supply of human dermis and epidermis." The Journal of physiology, 2002. 538(3): pp. 985-994.

"Thermo Scientific Orion Chlorine XP Water Quality Analyzer UM-269688-001 Revision C." Nov. 2016: pp. 1-57.

Uchida, T., et al., "Effect of NaCl on the Lifetime of Micro-and Nanobubbles". Nanomaterials, Feb. 2016. 6(2): 10 pages.

United States Environmental Protection Agency, Method 8265, Volatile Organic Compounds in Water, Soil, Soil Gas, and Air by Direct Sampling Ion Trap Mass Spectrometry (DSITMS). Mar. 2002: pp. 1-64.

Van Smeden, J. and J.A. Bouwstra, "Stratum corneum lipids: their role for the skin barrier function in healthy subjects and atopic dermatitis patients", in Skin Barrier Function. Feb. 2016, Karger Publishers. 2 pages (abstract only).

Wikipedia, "Air pollution", accessed on May 26, 2017 at <https://en.wikipedia.org/wiki/Air_pollution>. 2017: pp. 1-26.

Wikipedia, Metastability, accessed on Jun. 5, 2017 at <https://en.wikipedia.org/wiki/Metastability>. 2017. pp. 1-5.

Yeomans, et al. "Oxygen absorption by skin exposed to oxygen supersaturated water." Can J Physiol. Pharmacol. May 2012. 1 page (abstract only).

Yeomans, et al. "Skin oxygen tension is improved by immersion in oxygen-enriched water."Int. J. Cosmet. Sci. Dec. 2013. 1 page (abstract only).

Yin, H., et al., "Metastable water clusters in the nonpolar cavities of the thermostable protein tetrabrachion". Journal of the American Chemical Society, 2007. 129(23): pp. 7369-7377.

Corrected Notice of Allowability for U.S. Appl. No. 15/727,470, filed Oct. 6, 2017 on behalf of Perfect Water Worldwide, LLC. dated Aug. 5, 2020. 3 pages.

Notice of Allowance for U.S. Appl. No. 15/727,470, filed Oct. 6, 2017 on behalf of Perfect Water Worldwide, LLC. dated Jun. 26, 2020. 15 pages.

\* cited by examiner

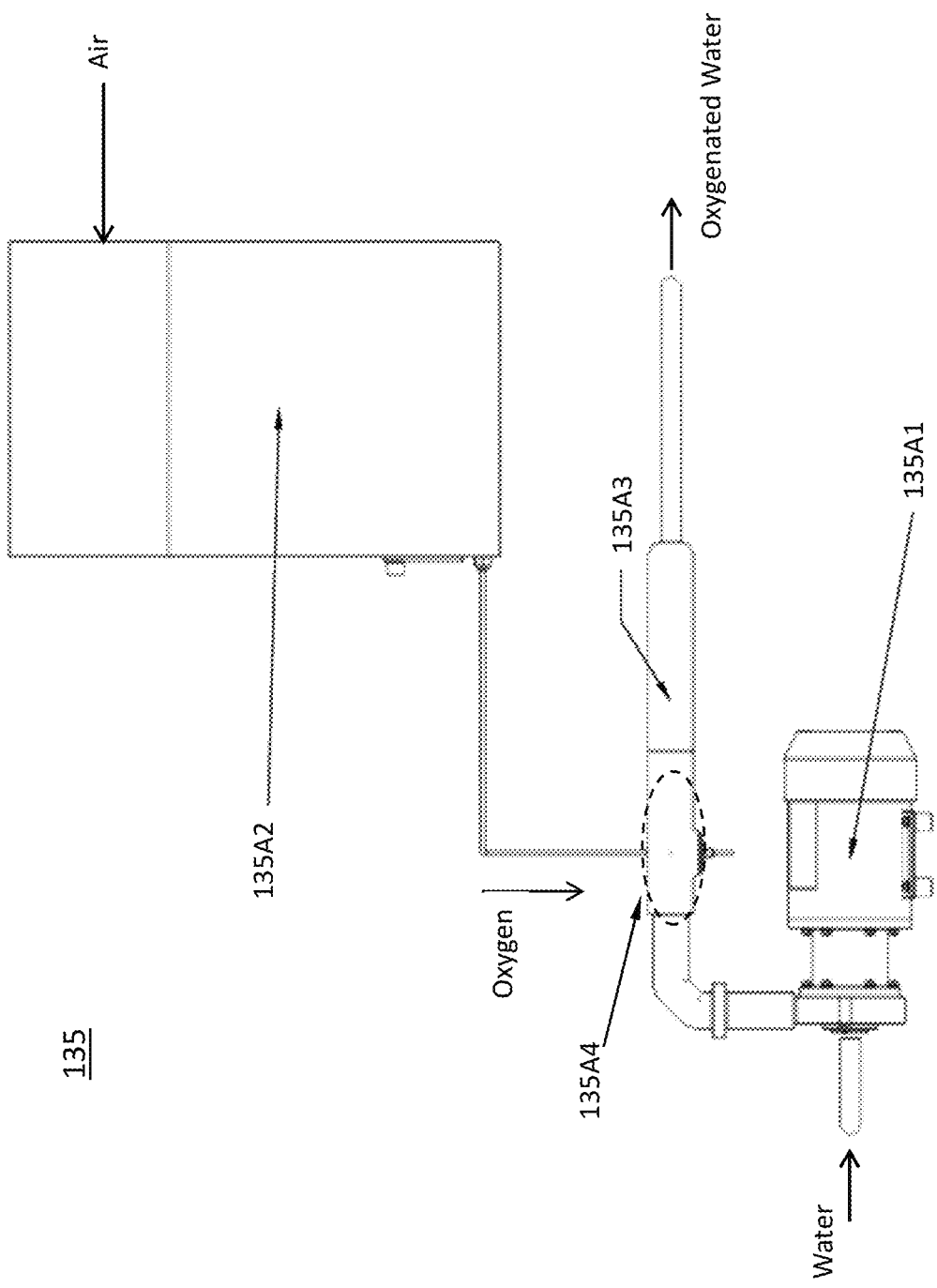

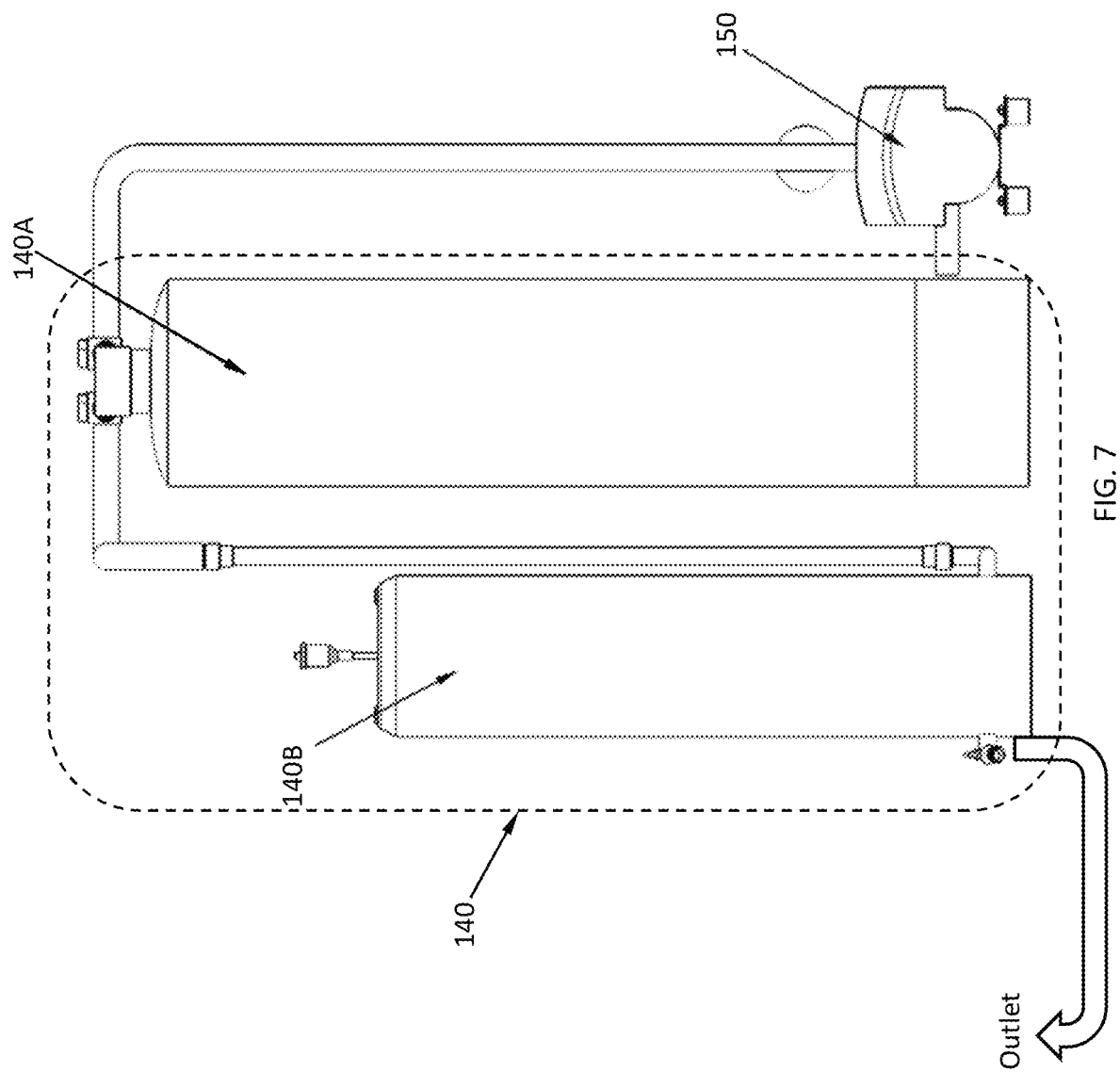

SELF-CONTAINED WATER SYSTEM

CROSS REFERENCE TO RELATED APPLICATIONS

The present application may be related to U.S. application Ser. No. 15/727,470 entitled "HYPER-OXYGENATED SOAKING SPA SYSTEM" filed on even date herewith, U.S. provisional Application No. 62/569,432 entitled "VORTEXING CHAMBER AND SYSTEM" filed on even date herewith, and U.S. application Ser. No. 15/727,560 entitled "HYPER-OXYGENATED WATER COMPOSITIONS AND RELATED METHODS AND SYSTEMS" filed on even date herewith, each of which is incorporated herein by reference in its entirety.

TECHNICAL FIELD

The present disclosure relates to systems and methods for control of water quality for residential and commercial use, including purification and restructuring of water via a centralized and self-contained single point delivery system.

BACKGROUND

Before the industrial revolution, pure, living, and oxygen rich water was available through any fast-moving river or stream. Vortexed and tumbled over rocks, a perfect water was created the way nature intended it to be, endowed with physical and energetic qualities necessary to cleanse and nourish the human body.

Municipal water delivery systems may be overburdened with chemicals, pesticides and pharmaceuticals that may be difficult to remove. One way cities can meet federal mandated water standards to provide disease free water is by adding more chemicals, including health hazardous chemicals such as, for example, chlorine and chloramines.

In order to remove some of the ill effects of current municipal water delivery systems, including potential long-term health hazards, end users may recourse to a variety of additional water filtration systems. One of the most widely used water filtration systems is one based on reverse osmosis, a sixty years old technology that produces de-mineralized, acidic water through a highly inefficient process. For each gallon of water that a reverse osmosis based system filters, over a gallon of water, usually three to four gallons, is wasted.

Alternative to addition of filtering systems, end users may recourse to pre-filtered water, such as, for example, bottled water. A person skilled in the art would know that bottled water is part of a largely unregulated industry and may not provide contaminant-free water. In effect, the National Resources Defense Council has reported significant contamination in over a third of the thousands of bottles of water tested. In addition, the California Research Center found that plastic bottles may leach health hazardous BPA's (bisphenol A) linked to both breast and prostate cancer, and recommends using glass or stainless steel, which may also help eliminating plastic pollution that is caused by billions of plastic bottles discarded annually.

In view of the above, there is a need for an environmentally friendly water quality control system for residential and commercial use that can provide water with qualities similar to what nature had intended, and which can be used for any or all of drinking, bathing, showering and swimming.

SUMMARY

Teachings according to the present disclosure include a low maintenance water system that is configured to purify incoming water and restructure the purified water to deliver pure, alkaline, ionized, mineral-rich water to an entire residential or commercial site. Such water system may be configured as a centralized and self-contained single point delivery system.

According to a first embodiment the present disclosure, a self-contained water system is presented, the self-contained water system comprising: a water inlet; a water outlet; a holding tank; a water pre-treatment stage configured to receive water from the water inlet and provide pre-treated water to the holding tank having a total dissolved solids (TDS) of about 4 parts per million (ppm); a water sanitizer stage configured to receive water from the holding tank and provide temperature controlled sanitized water to the holding tank; a water oxygenation stage configured to receive water from the holding tank and provide oxygenated water to the holding tank, the water oxygenation stage further configured to control a dissolved oxygen concentration of the water provided to the holding tank from a low value equal to 10 ppm, to a high value equal to 50 ppm, and to any value between the low value and the high value; and a water post-treatment stage configured, upon detection of a pressure demand at the water outlet, to receive water from the holding tank and provide post-treated water to the water outlet having mineral content according to a desired level.

According to a second embodiment of the present disclosure, a method for water treatment is presented, the method comprising: feeding water from an inlet to a water pre-treatment stage configured to receive water from the water inlet and provide pre-treated water to a holding tank having a total dissolved solids (TDS) of about 4 parts per million (ppm); circulating the pre-treated water from the holding tank through a water sanitizer stage configured to receive water from the holding tank and provide temperature controlled sanitized water to the holding tank; circulating the pre-treated and sanitized water from the holding tank through a water oxygenation stage configured to receive water from the holding tank and provide oxygenated water to the holding tank, the water oxygenation stage further configured to control a dissolved oxygen concentration of the water provided to the holding tank from a low value equal to 10 ppm, to a high value equal to 50 ppm, and to any value between the low value and the high value; and upon detection of a pressure demand at a water outlet, feeding pre-treated, sanitized, and oxygenated water from the holding tank to the outlet through a water post-treatment stage that is configured to post-treat the water to provide a mineral content according to a desired level.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 6A illustrates details of the oxygenation loop of the self-contained configuration depicted in FIG. 2.

FIG. 7 illustrates details of the conditioner stage and the delivery pump of the self-contained configuration depicted in FIG. 2.

DETAILED DESCRIPTION

As used herein, the expression "hyper-oxygenated water" refers to a water which contains molecular oxygen $O_2$ in a total amount of at least 10 ppm up at a temperature ranging from 4° C. to 50° C.

As used herein, the expression "dissolved oxygen" refers to oxygen that is homogeneously mixed with water in a thermodynamically stable state to form a single phase of matter. In this context, as used in the present disclosure, the dissolved oxygen is also said to be stabilized, or stable, oxygen in the water.

As used herein, the term "nanobubble" refers to a substantially spherical body of gas having a diameter of 100 nm or less, wherein the substantially spherical body is suspended in liquid water.

Figure 1:
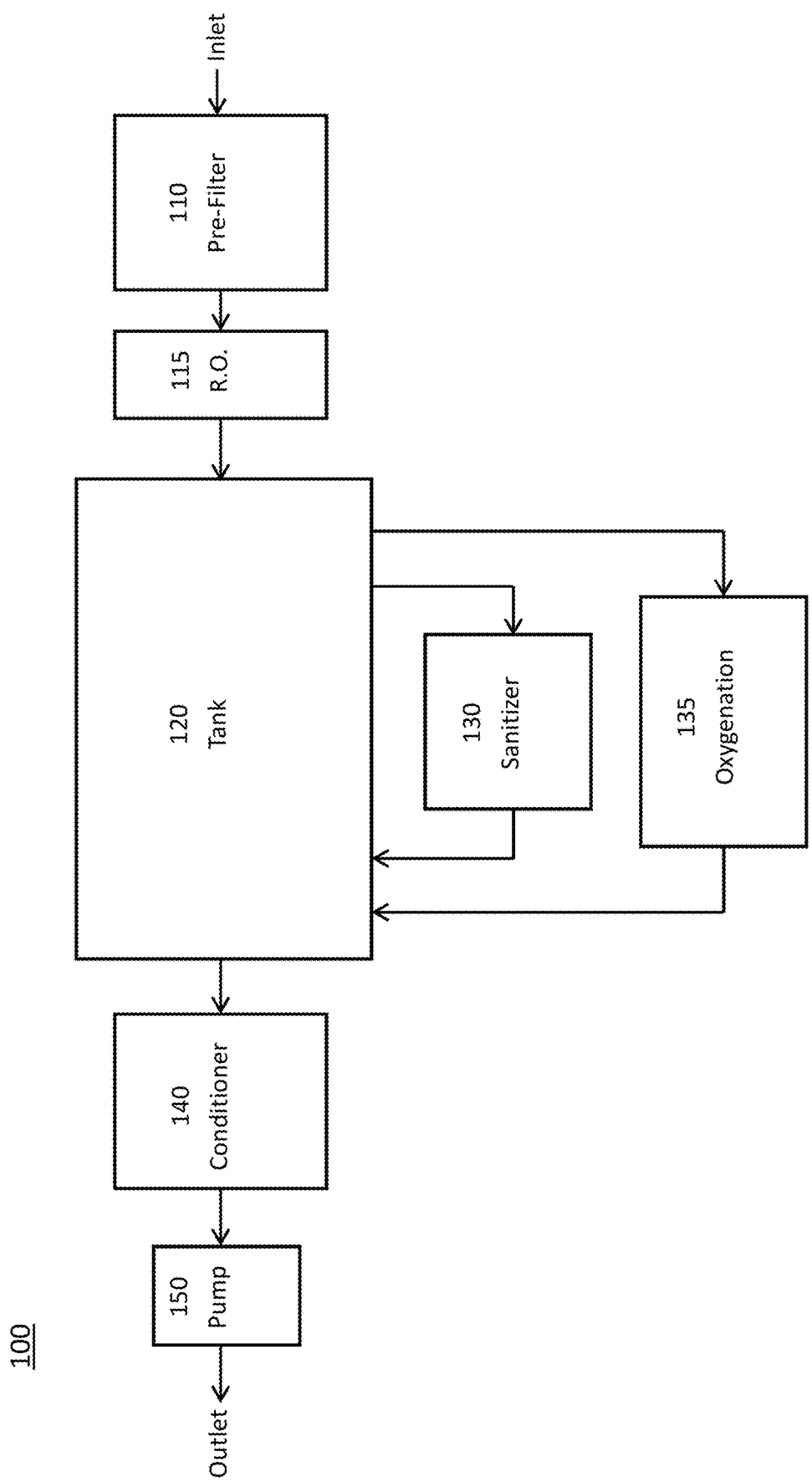
FIG. 1 illustrates a functional block diagram of the water system according to the present disclosure, comprising a pre-filter stage, an R.O. (reverse osmosis) stage, a water holding tank, a sanitizer loop, an oxygenation loop, a conditioner stage, and a delivery pump.

FIG. 1 illustrates a functional block diagram (100) of the water system according to the present disclosure which is configured to purify incoming water through an inlet, and restructure the purified water to deliver, at an outlet, pure, alkaline, ionized, oxygen-rich, mineral-rich water at a controlled temperature to an entire residential or commercial site.

With continued reference to the functional block diagram (100) of FIG. 1, water fed through the inlet is routed to a pre-filtering stage (110) which is configured to soften and pre-filter the incoming water and remove any particles that may damage elements of the next block, the reverse osmosis R.O. stage (115). The pre-filtered and softened water is fed to the reverse osmosis R.O. stage (115) to further reduce total dissolved solids (TDS) in the water to about 4 parts per million (ppm) or less before feeding the water to the tank (120).

The low TDS water in the holding tank (120) may in turn be processed according to functionalities provided by two separate water treatment loops; the sanitizer loop (130) and the oxygenation loop (135). The sanitizer loop (130) may sanitize the water by disinfecting the water and removing contaminants and other impurities that could not be removed by the preceding blocks. These include any living contaminants and bacteria or other microorganisms. The sanitizer loop (130) may further be configured to chill the water and maintain the water temperature at a substantially constant low temperature (e.g., 8-15 degrees Celsius). Accordingly, the water in the holding tank (120) is a filtered, chilled and contaminant free water, therefore devoid of organic and inorganic contaminants.

Independent from the sanitizer loop (130), the oxygenation loop (135) may be used to enrich oxygen content of the water in the holding tank (120) by mixing appropriate amount of oxygen with water through a high velocity hydraulic system that generates nanobubbles of oxygen that are entrained in the water. Total dissolved oxygen concentration of the water may be monitored and accordingly kept to a desired concentration (any concentration from about 10 ppm to 50 ppm) by controlling ON/OFF cycles of the oxygenation loop (135) in a closed loop fashion. Alternatively, an ON/OFF duty cycle of the oxygenation loop (135) may be pre-programmed based on known/expected total dissolved oxygen concentration in the holding tank (120). In other words, the oxygenation loop (135) is configured to produce and deliver to the holding tank (120), oxygen-rich water, including hyper-oxygenated water. It should be noted that the pretreatment of the water in the holding tank (120), via the pre-filter stage (110) and the R.O. stage (115) according to the present disclosure promotes stabilization and retention of a high concentration of oxygen in the range of 10 ppm-50 ppm. The inventor of the present disclosure has found that removal of organic and inorganic impurities from the water, and subjecting such water through a vortexing device according to the present disclosure included in the oxygenation loop, later described, may create voids (e.g., nano-voids, or nano-sized voids, where 'nano' represents $10^{-9}$ meters) at the molecular level in the water which may be filled with oxygen molecules to provide an increase in the dissolved oxygen concentration of the water.

With further reference to FIG. 1, the holding tank (120) of the water system (100) according to the present teachings is therefore configured to contain substantially constant temperature water that is free of nearly all organic and inorganic contaminants. Furthermore, total dissolved concentration of oxygen in the water of the holding tank can be controlled by the oxygenation loop (135) to levels in a range of about 10 mg/L (i.e., 10 ppm), for a case where the oxygenation loop is disabled, to about 50 mg/L (i.e., 50 ppm).

Delivery of water from the holding tank (120) to the outlet is provided by a water post-treatment stage comprising the conditioner stage (140) and the delivery pump (150). Delivery of water to the outlet is triggered via pressure demand at the outlet, which causes the delivery pump (150) to activate and send water though the conditioner stage (140) to the outlet for end use. The conditioner stage (140) may condition the water to include a desired amount of minerals at a desired level of alkalinity (pH).

It follows that the functional blocks of the water system (100) according to the present teachings depicted in FIG. 1 process the incoming water provided at the inlet to deliver, at the outlet, remineralized alkaline water that is essentially free of organic and inorganic contaminants at a substantially constant temperature, with control of dissolved oxygen concentration of the water. Further implementation details are described in the following paragraphs.

Figure 2:
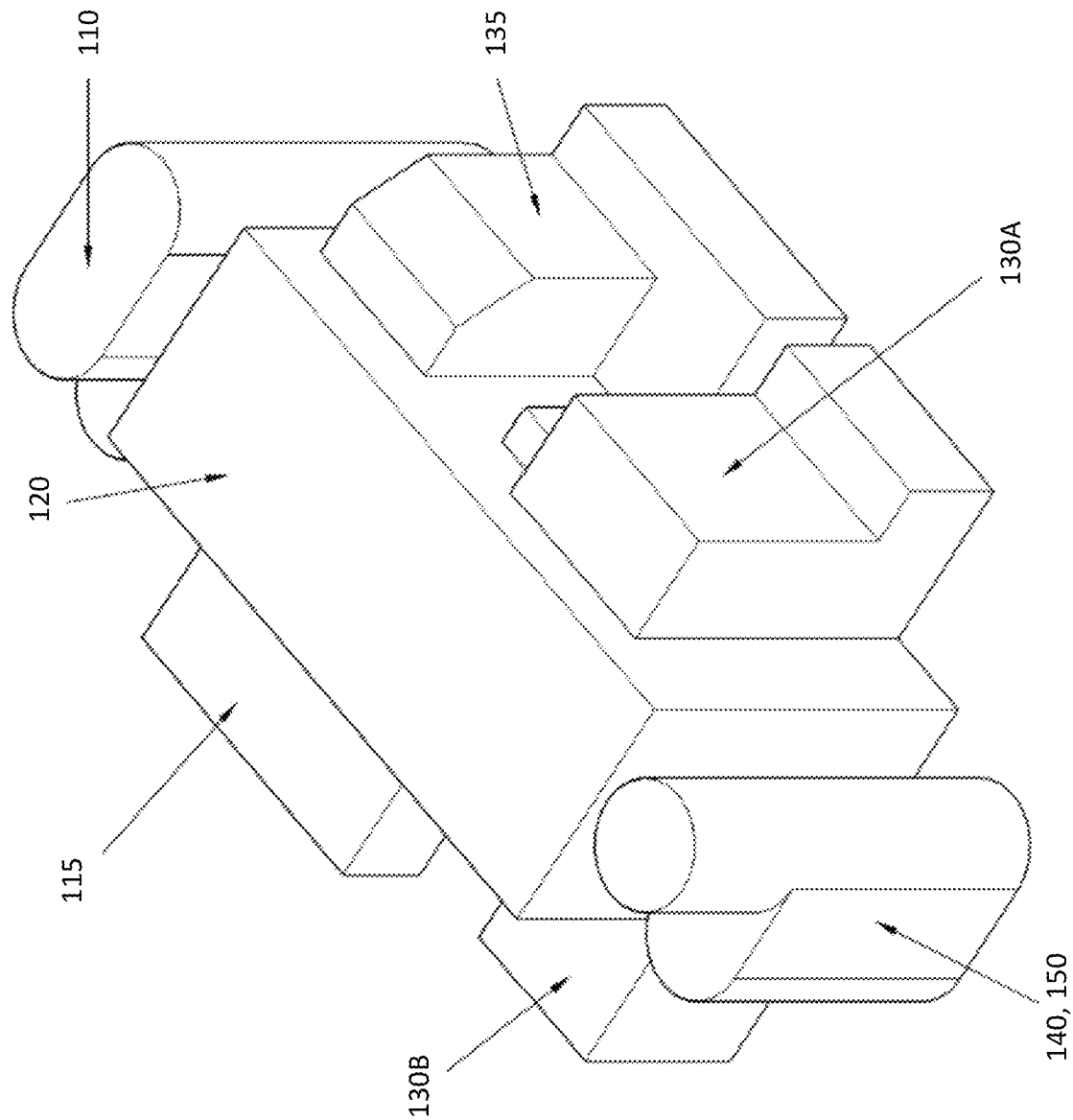
FIG. 2 illustrates an isometric view of an assembly representative of a self-contained configuration of the water system according to the present disclosure.

FIG. 2 illustrates an isometric view (200) of an assembly representative of a self-contained configuration of the water system according to the present disclosure. The various functional blocks discussed above with reference to the block diagram of FIG. 1 are indicated in FIG. 2. A person skilled in the art would appreciate advantages associated with the self-contained assembly configuration (200) depicted in FIG. 2, including advantages associated to manufacturing, testing, troubleshooting, transportation, installation, reduced footprint, and maintenance.

With further reference to FIG. 2, the various functional blocks of the water system according to the present teachings are placed around the holding tank (120) that is centrally located to the assembly (200) and therefore providing immediate access of the water to the various other functional blocks for a reduced length of piping and a higher efficiency of water temperature control.

Figure 8A:
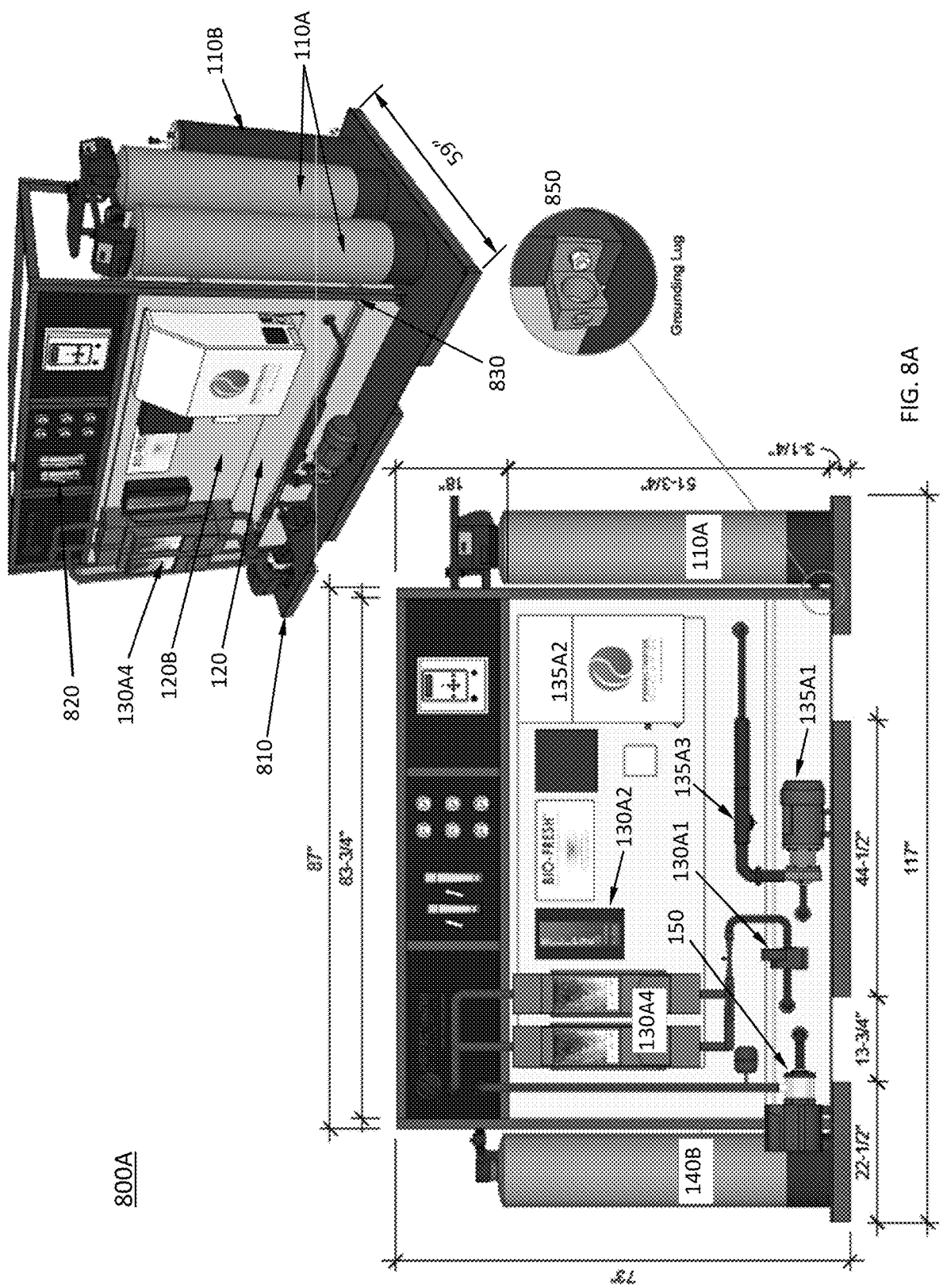
FIG. 8A illustrates two different views of an assembly of the self-contained configuration depicted in FIG. 2 with further details, including exemplary dimensional details.

With continued reference to FIG. 2, some of the functional blocks may be physically separated, as shown for the case of the sanitizer loop (130), where a chiller stage (130B) can be seen placed separately from the main sanitizer loop (130A). As can be seen in FIG. 8A later described, the entire self-contained water system assembly (200) may be placed on a baseplate (810) with a frame structure (830) that may be used to fixate the holding tank (120) and mount some of the functional blocks (e.g., the sanitizer and oxygenation loops). Added structural rigidity to the self-contained water system assembly of FIG. 2 can be therefore provided by the baseplate (810) and the frame structure (830), and the baseplate (810) can define a footprint of the self-contained water system assembly.

Figure 3:
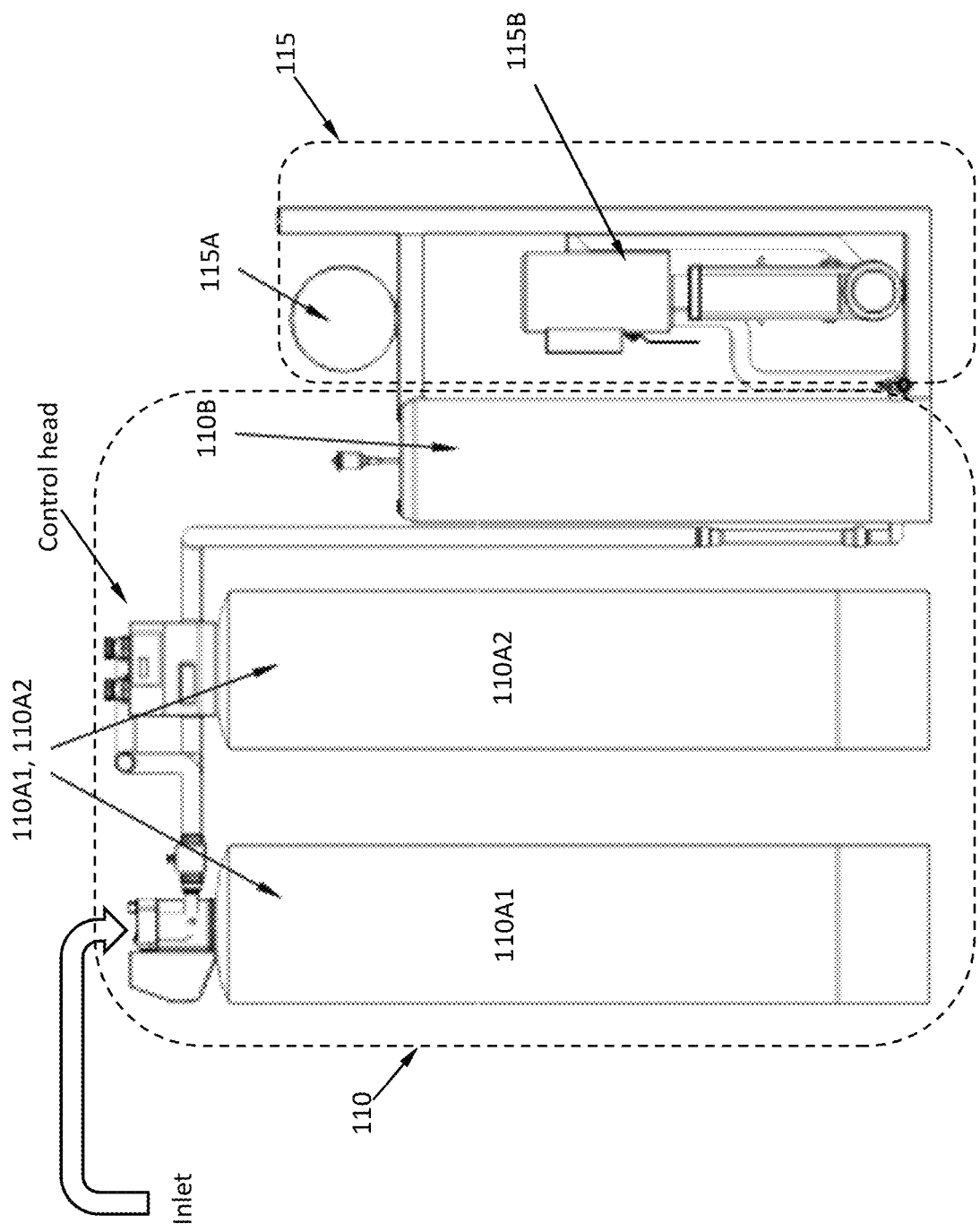
FIG. 3 illustrates details of the pre-filter and R.O. stages of the self-contained configuration depicted in FIG. 2.

FIG. 3 shows details of the pre-filtering functional stage (110) and the reverse osmosis R.O. functional stage (115). According to an embodiment of the present disclosure, the pre-filtering functional stage (110) comprises a water softening pretreatment element (110A) and a sediment filter element (110B).

The water softening pretreatment element (110A) may comprise a dual media tank with a single control head for pretreatment softening of water from the inlet. As noted above, such first stage pretreatment of water may remove larger particles and solids from the incoming water to protect subsequent functional blocks, including, for example, carbon media of the sediment filter element (110B) and a membrane of the reverse osmosis R.O. stage (115). The dual media tank may allow for constant softening of water due, for example, to a high demand of water flow rate from the outlet, by a feed pump (115B) of the reverse osmosis R.O. functional stage (115). In other words, the feed pump (115B) pushes water from the inlet, through the pretreatment element (110A), the sediment filter (110B), and the R.O. functional stage to the holding tank (120).

As shown in FIG. 3, according to one exemplary embodiment of the present disclosure, the water softening pretreatment element (110A) may comprise, for example, two 13 inches by 54 inches carbon filtration media tanks (110A1, 110A2). According to one embodiment present disclosure, the carbon filtration media tanks (110A1, 110A2) are both filled with catalytic carbon and are plumbed to run in parallel to provide the proper flow rate to the R.O. feed pump (115B). According to another embodiment of the present disclosure, the first carbon filtration media tank (110A1) may be filled with a mixture of (kinetic degradation fluxion) KDF carbon and catalytic carbon, and the second carbon filtration media tank (110A2) may be filled with (organic) coconut (shell) carbon, and run in parallel to adequately handle the desired flow rate of water being provided to the reverse osmosis R.O. pump (115B). Alternatively, the carbon filtration media tanks (110A1, 110A2) may be plumbed in series. Furthermore, the media (for example, coconut carbon, KDF carbon, catalytic carbon, and other suitable filtration substances) in the tanks may be varied to achieve the proper desired preconditioning of the water being provided to the reverse osmosis R.O. pump (115B).

With continued reference to FIG. 3, treated softened water by the water softening pretreatment element (110A) is sent through a sediment filter (110B), e.g., a sediment filter by manufacturer Enpress LLC (Eastlake, Ohio, USA), configured to collect and trap sediment and other particles such as, for example, dirt, silt, and rust that may pass through the water softening pretreatment element (110A).

With further reference to FIG. 3, carbon filtered softened water, through the water softening pretreatment element (110A) and the sediment filter (110B), is fed to the reverse osmosis R.O. pump (115B) for provision to the R.O. membrane and housing (115A). According to one exemplary embodiment of the present disclosure, the reverse osmosis R.O. pump (115B) may be a three-phase high pressure pump to provide high enough water pressure and flow to push water through the R.O. membrane and housing (115A), thereby nano-purifying and reducing total dissolved solids (TDS) in the water provided to the holding tank (120). According to a preferred embodiment of the present disclosure, the reverse osmosis filtration stage (115) can reduce the total dissolved solids in the water provided to the holding tank (120) to 4 parts per million (ppm) or lower. It should be noted that such nano-purification of the water provided by the functional stages (110, 115) may create voids at the molecular level in the water that promote high levels of dissolved oxygen in the water. According to an embodiment of the present disclosure, untreated water from the reverse osmosis R.O. stage (115) is recycled through the R.O. stage to reduce effective wasted (drained) water to about 20% of the water from the pre-filter stage (110).

According to a preferred embodiment of the present disclosure, the reverse osmosis R.O. pump (115B) of FIG. 3 is configured to fill the holding tank (120) in a time less than one hour for a holding tank (120) capacity of 600 gallons (approximately 2,270 liters), and at a rate that is substantially greater than an expected average outflow of water (per end use) through the outlet of the water system (200).

Figure 4:
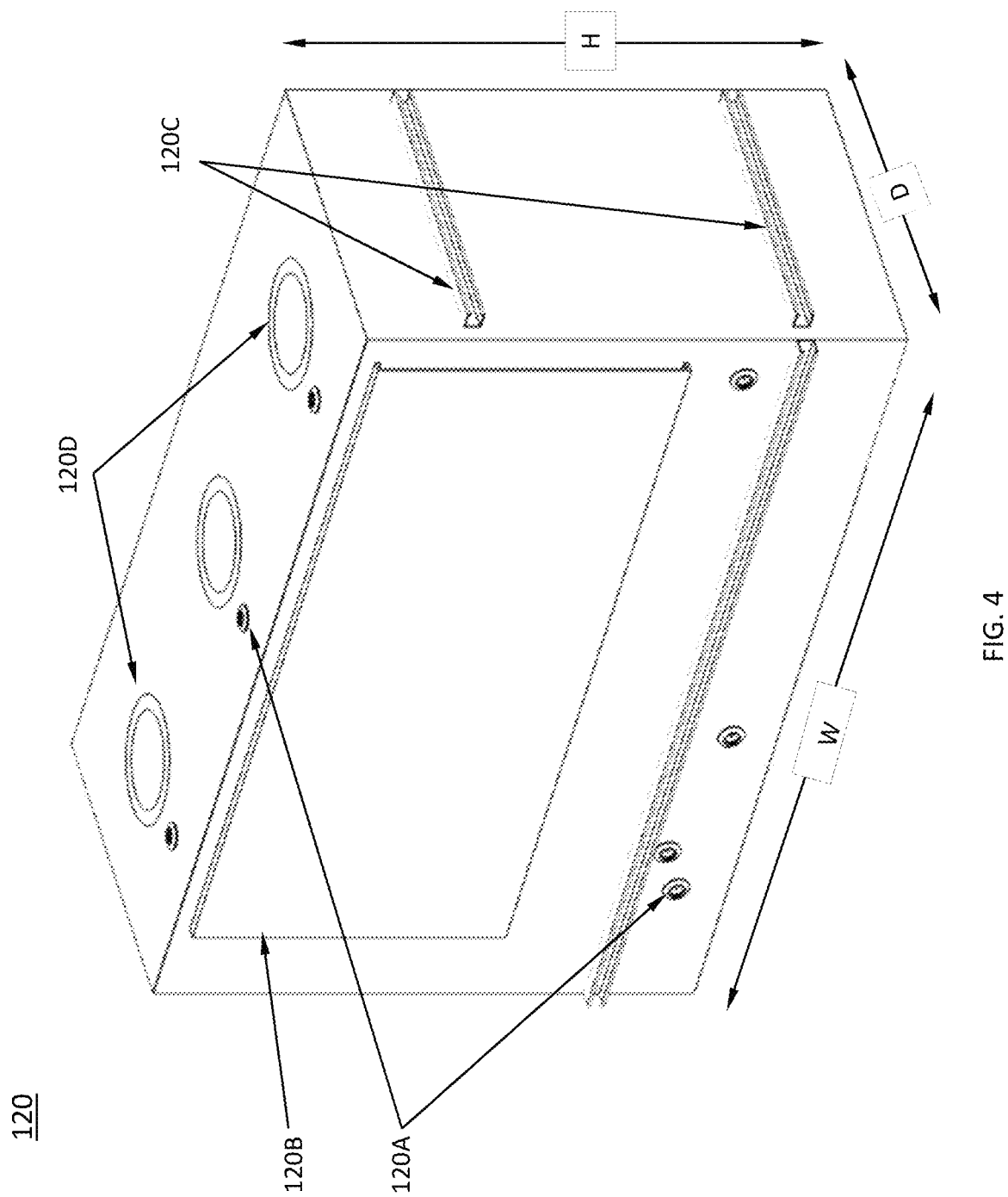
FIG. 4 illustrates details of the water holding tank stage of the self-contained configuration depicted in FIG. 2.

FIG. 4 illustrates details of the water holding tank (120) of the self-contained configuration (200) depicted in FIG. 2. According to a preferred embodiment of the present disclosure, the holding tank (120) has a water capacity of about 600 gallons (approximately 2,270 liters) and is made of 316 grade stainless steel. Capacity of the tank can be modified to cater to larger water usage demands. As shown in FIG. 4, holes (120A) in the holding tank (120) are configured to provide water coupling means to the functional blocks (115, 130, 135, 140), while a mounting plate (120B) and mounting rails (120C) may be used for mounting/attaching of the functional blocks as required. Softened, carbon filtered, reverse osmosis R.O. treated water through functional blocks (110, 115) is fed to the holding tank (120) for further treatment by the sanitizer loop (130) and the oxygenation loop (135). The sanitizer loop (130) maintains the water in the holding tank (120) in a constant treated state, and the oxygenation loop (135) maintains a desired dissolved oxygen concentration of the water in the holding tank (120). Also, maintenance and service holes (120D) may be provided on a top side of the holding tank (120) to facilitate access to the interior of the tank.

With further reference to the holding tank (120) depicted in FIG. 4, according to an embodiment of the present disclosure, one or more sensors (e.g., optical sensors) may be used to detect a level of the water in the holding tank (120), and accordingly control activation/deactivation of the reverse osmosis R.O. pump (115B) to maintain water volume inside the holding tank (120) at a desired level. Set points for the desired water volume may be set according to a low-fill set point and a high-fill set point that respectively dictate activation and deactivation of the R.O. pump (115B). According to an embodiment of the present disclosure, the low-fill set point may represent 85% water volume with respect to the capacity of the holding tank (120), and the high-fill set point may represent 95% water volume with respect to the capacity of the holding tank (120).

Although dimensions of the tank may be according to any form factor, according to a preferred embodiment of the present disclosure, dimensions of the holding tank (120) are designed to represent the Golden Ratio. In other words, dimensions of the holding tank (120), represented by a height H, a width W, and a depth D of a substantially symmetrical shape (e.g., rectangular cuboid), are such that one or more of any two dimensions of (H, W, D) are bound by the Golden Ratio rule well known to a person skilled in the art. According to an exemplary embodiment of the present disclosure, dimension pairs (H, W)=(51.75 inches, 83.75 inches) and (H, D)=(51.75 inches, 32 inches), are bound by the Golden Ratio.

Figure 5:
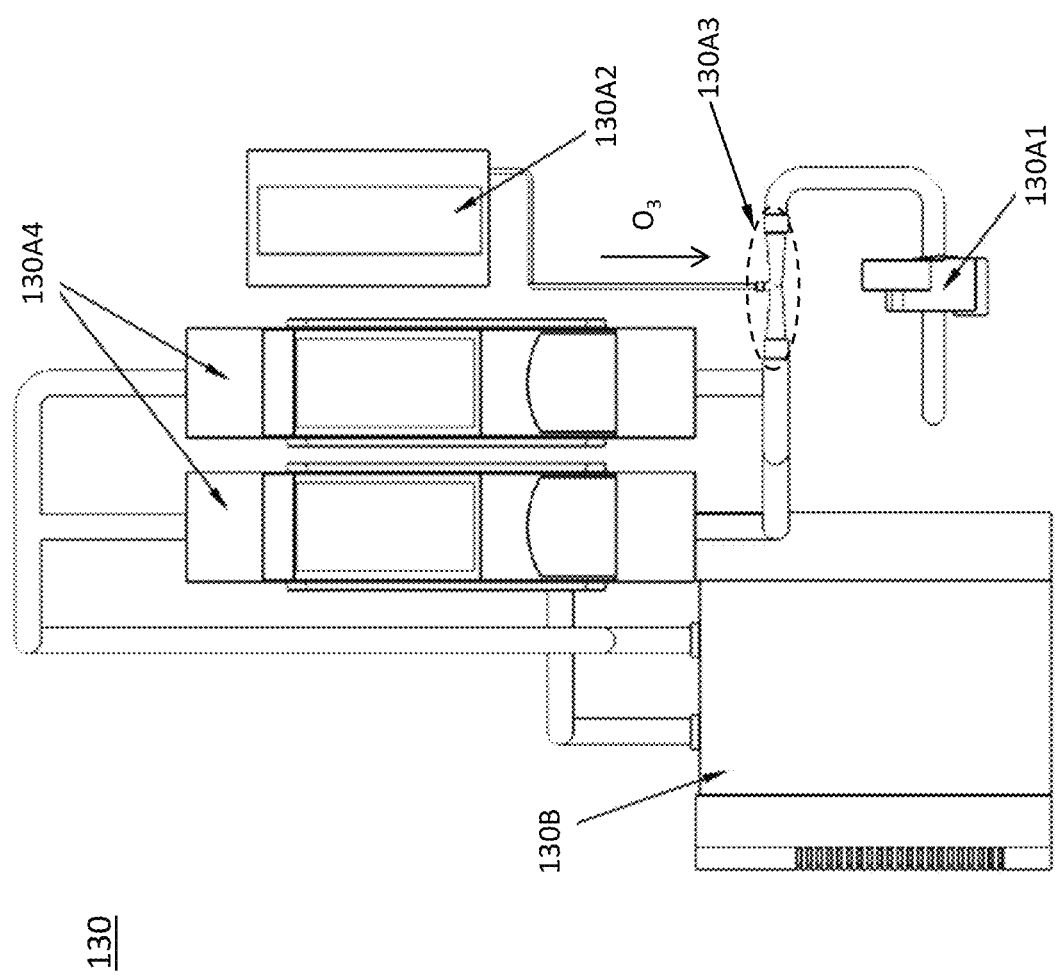
FIG. 5 illustrates details of the sanitizer loop of the self-contained configuration depicted in FIG. 2.

FIG. 5 illustrates details of the sanitizer loop (130) of the self-contained configuration (200) depicted in FIG. 2. A circulation pump (130A1) pushes water from the holding tank (120) into the various stages of the sanitizer loop (130), comprising, an ozonation stage (130A2), a pressure differential injector (130A3), an ultra violet UV treatment stage (130A4), and a chiller stage (130B), and back to the holding tank (120). Accordingly, the circulation pump (130A1) circulates water from the holding tank (120) through the sanitizer loop (130) to effectively disinfect the water and remove contaminants and other impurities that could not be removed by the preceding blocks (110, 115), including microorganisms such as bacteria, while maintaining the water temperature at a substantially constant low temperature (e.g., 8-15 degrees Celsius). According to a preferred embodiment of the present disclosure, the circulation pump (130A1) may be provided by pump manufacturer Grundfos (Bjerringbro, Denmark).

With further reference to FIG. 5, according to a preferred embodiment of the present disclosure, recirculation of the water through the sanitizer loop (130), and therefore treatment of the water in the holding tank (120) though the sanitizer loop (130), may be continuous in time (e.g., loop that runs 24 hours per day), and according to a water flow controlled by a constant speed of the circulation pump (130A1). According to one exemplary embodiment of the present disclosure, the constant speed of the circulation pump (130A1) may be in a range of [2,500-3,500 rpm] to provide a medium flow of water in a range of [38-56 l/s] (or about 10-15 gallons/s). Such flow of water may be sufficient to treat a full volume of water in holding tank (120) having a capacity of about 600 gallons (approximately 2,270 liters) in about 40 minutes.

With continued reference to FIG. 5, water flow generated by the circulation pump (130A1) passes through a pressure differential injector (130A3) that pulls ozone ($O_3$) from the (ozone generator) ozonation stage (130A2) into the flow of water, thereby ozonating the water. A person skilled in the art is well aware of the beneficial effects of ozonation of water, including natural disinfection and oxidation of the water. According to a preferred embodiment of the present disclosure, the pressure differential injector (130A3) may be a Venturi injector manufactured by Mazzei Injector Company, LLC (Bakersfield, Calif., USA).

Further sanitization of the water through the sanitizer loop (130) is provided by the ultra violet UV treatment stage (130A4) depicted in FIG. 5, which comprises a high-power UV light configured to radiate the water. As the ozonated water passes through the UV treatment stage (130A4), microorganisms in the water, such as, for example, *Cryptosporidium*, *E. Coli*, Fecal Coliform, and Giardia, are killed. The UV treatment stage (130A4) is also effective in killing other pathogens that cause diseases such as, for example, typhoid, gastroenteritis, hepatitis, influenza and cholera. Finally, the UV treatment stage (130A4) may organically increase oxidation potential of ozone in the water as provided through the ozonation stage (130A2).

According to a preferred embodiment of the present disclosure, the UV treatment stage (130A4) may comprise two ultraviolet treatment quartz vessels operating in parallel for a higher water treatment throughput. After passing through the UV treatment stage (130A4), water is sent through the chiller stage (130B) before being fed back into the holding tank (120). The chiller stage (130B) is designed to maintain temperature of the water in the holding tank (120) at a substantially constant low temperature (e.g., 8-15 degrees Celsius) through a dedicated controller.

With further reference to the sanitizer loop (130) depicted in FIG. 5, according to a preferred embodiment of the present disclosure, the chiller stage (130B) may further provide functionality of carbon filtration through activated carbon. A small housing comprising activated carbon may be used as a last treatment stage of the sanitizer loop (130) for balancing of the pH of the recirculated water. Accordingly, the pH of the water in the holding tank (120) may be balanced. According to a preferred embodiment of the present disclosure the activated carbon may include (organic) coconut carbon. Carbon filtration of the recirculated water through the sanitizer loop (130) provides the last treatment stage of the water prior to its return to the holding tank (120), thus closing the sanitizer loop (130).

FIG. 6A illustrates details, according to the present disclosure, of the oxygenation loop (135) of the self-contained configuration (200) depicted in FIG. 2. The oxygenation loop (135) forms a closed loop that is configured to raise and sustain predetermined high levels of dissolved oxygen to the already nanopurified water in the holding tank (120). As can be seen in FIG. 6A, the oxygen loop (135) may comprise a high velocity pump (135A1) configured to push water from the holding tank (120) into the oxygenation loop (135), an oxygen generator (135A2), for example, a compressor or a concentrator, configured to provide oxygen for mixing with a water flow generated by the high velocity pump (135A1), an oxygen injector device (135A4) configured to inject the oxygen into the flow of water, and a vortexing device (135A3) configured to affect hydrodynamic properties of the water-oxygen mixture so that oxygen bubbles, including nanobubbles, and voids (i.e., spacing between molecules and/or clusters of water), including nano-voids are formed in the water, thereby increasing the dissolved oxygen concentration of the water by filling the voids, including the nano-voids, with the oxygen bubbles, including nanobubbles.

With continued reference to FIG. 6A, the high velocity pump (135A1) is configured to provide a high velocity flow rate of the water to allow oxygen to be efficiently injected, via an oxygen injector device (135A4), and dissolved, via the vortexing device (135A3), into the flow of water.

With further reference to FIG. 6A, a high velocity flow rate of oxygen rich water is fed to the vortexing device (135A3) that is placed immediately after, and at close proximity to, the oxygen injector device (135A4).

Figure 6B:
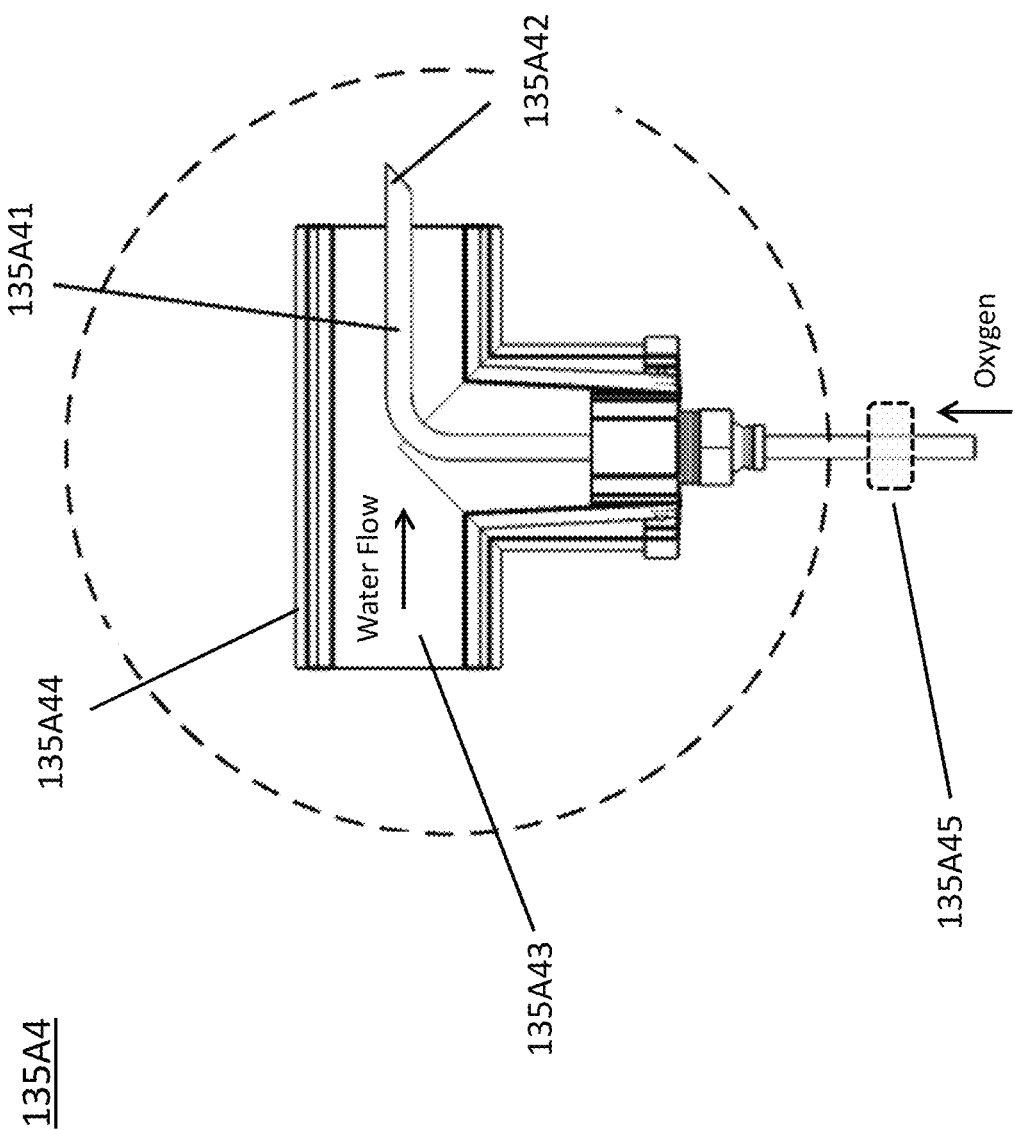
FIG. 6B illustrates details of an oxygen injector device, according to an embodiment of the present disclosure, configured to inject oxygen into the oxygenation loop.

As shown in FIG. 6B, according to an embodiment of the present disclosure, the oxygen injector device (135A4) may comprise a tubular conduit (135A41), such as, for example, a pipe, made of a metal (e.g., stainless steel, copper, etc.) or a polymer based material (e.g., PVC or other), having one end coupled to the oxygen generator (135A2) for receiving the oxygen, and having the other end immersed in the water having a flow that is provided through the high velocity pump (135A1), wherein the end immersed in the water includes a longitudinal portion of the tubular conduit (135A41) that is substantially parallel to the flow of water. As shown in FIG. 6B, an optional high pressure check valve (135A45) may be provided at an inlet of the pipe (135A41) in order to prevent backflow of the water into the oxygen generator (135A2).

With further reference to FIG. 6B, the oxygen supplied through the oxygen injector device (135A4) may enter a channel (135A43) conducting the water in a direction perpendicular to the flow of the water, for example, through a Tee fitting (135A44). The tubular conduit (135A41) of the oxygen injector device (135A4) may bend at an angle such that the injected oxygen is generally according to a direction that is against the flow of the water, or, as shown in FIG. 6B, it may bend at an angle such that the injected oxygen is generally according to a direction that is substantially parallel to the flow of the water. The tubular conduit (135A41) may have an open-ended edge (135A42) for injecting the oxygen into the flow of water. The open-ended edge (135A42) can be provided by a cut of the tubular conduit (135A41) in a diagonal fashion with respect to the flow of the oxygen (e.g., 30° to 60°) so to increase a surface area at a plane where oxygen meets the water. Alternatively, the open-ended edge (135A42) may be provided by a cut of the tubular conduit (135A41) in a substantially perpendicular fashion with respect to the flow of the oxygen (e.g., 85° to 95°) so to reduce the surface area at the plane where oxygen meets the water.

According to an exemplary embodiment of the present disclosure, the vortexing device (135A3) depicted in FIG. 6A may provide a spiral shaped path along a longitudinal direction of the device to provide a spinning effect to the high velocity flow rate of oxygen rich water. The spiral shaped path may effectively increase the high velocity flow rate of the oxygen rich water and cause formation of oxygen nanobubbles within the water, which in turn stabilize in the water to increase the dissolved oxygen concentration of the water.

According to one exemplary embodiment of the present disclosure, the vortexing device (135A3) provides the spiral shaped path by way of physical structures, placed within a chamber of the vortexing device (135A3), the physical structures confining the oxygen rich water to within a substantially spiral shaped physical path created by the physical structures. Such physical structures may be provided by way of one or more twisted pipes (not shown) along the longitudinal direction of the chamber of the vortexing device (135A3).

Figure 6C:
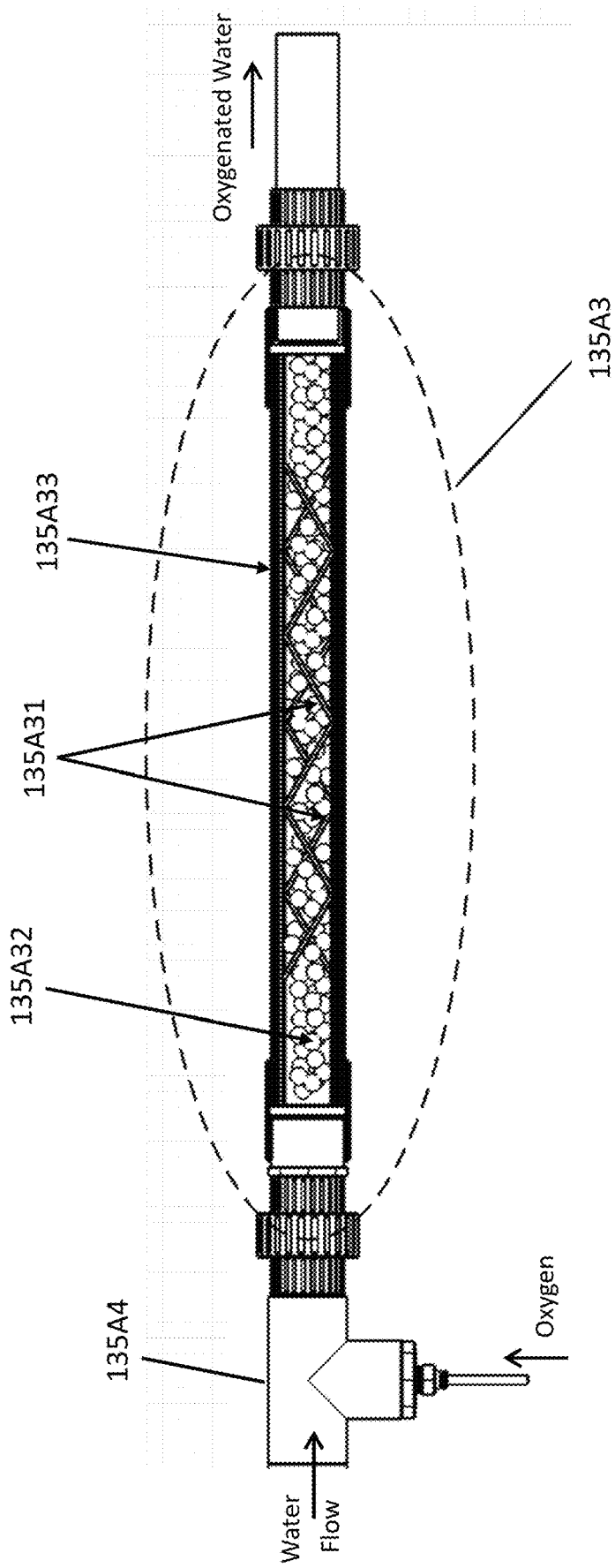
FIG. 6C illustrates details of a vortexing device, according to an embodiment of the present disclosure.

Alternatively, and according to a preferred embodiment of the present disclosure depicted in FIG. 6C, a spiraling effect of the water flow through the vortexing device (135A3) can be provided via two or more series of interconnected baffles (135A31) placed inside of a chamber (135A33) along the longitudinal direction of the vortexing device (135A3), where the two or more series of interconnected baffles (135A31) are configured, in combination, to substantially guide the flow of water inside the chamber (135A33) according to a spiral shaped path. In such configuration, the water is not confined to walls of a spiral shaped physical structure, but rather to the inner wall of the chamber (135A33), and is further diverted by the series of interconnected baffles (135A31) according to a spiral shaped flow path.

According to a further preferred embodiment of the present disclosure, the vortexing device (135A3) may include rose quartz crystal spheres (e.g., 135A32 of FIG. 6C) that are seated along the spiral shaped path of the vortexing device, configured to energize the water. As known to a person skilled in the art, water can be restructured through radiation, or radiant energy, provided by such rose quartz crystal spheres. As a result, high level oxygen enriched, rose quartz energized water is returned to the holding tank (120). Dissolved oxygen in the water of the holding tank (120) may be kept at a substantially constant concentration (e.g., between 10 ppm to 50 ppm) through a closed loop control system that includes a dissolved oxygen concentration meter and membrane sensor. The meter and membrane sensor may work together to start and stop the oxygenation loop (135) any time the dissolved oxygen concentration falls or rises above two preset set points measured, for example, in parts per million (ppm) or mg/L. Alternatively, the dissolved oxygen concentration may be controlled in an open loop fashion through a timer that controls an ON/OFF duty cycle of the oxygenation loop (135).

With further reference to the rose quartz crystal spheres (e.g., 135A32 of FIG. 6C), according to an exemplary embodiment of the present disclosure, such rose quartz crystal spheres can have a diameter between about 15 mm and 20 mm (0.5 inches to 1.0 inches). Mechanical vibration of the crystal spheres due to the high velocity flow of water through the chamber (135A33) of the vortexing device (135A3) can create collisions between the crystal spheres and bubbles of oxygen within the water, therefore resulting in smaller size bubbles to further promote generation of nanobubbles. Furthermore, frequencies associated to said mechanical vibration can cause a greater variation in water pressure through the vortexing device (135A3) which can result in voids, including nano-voids, in the water which can be filled with the smaller size bubbles, including nanobubbles, of oxygen.

Figure 6D:
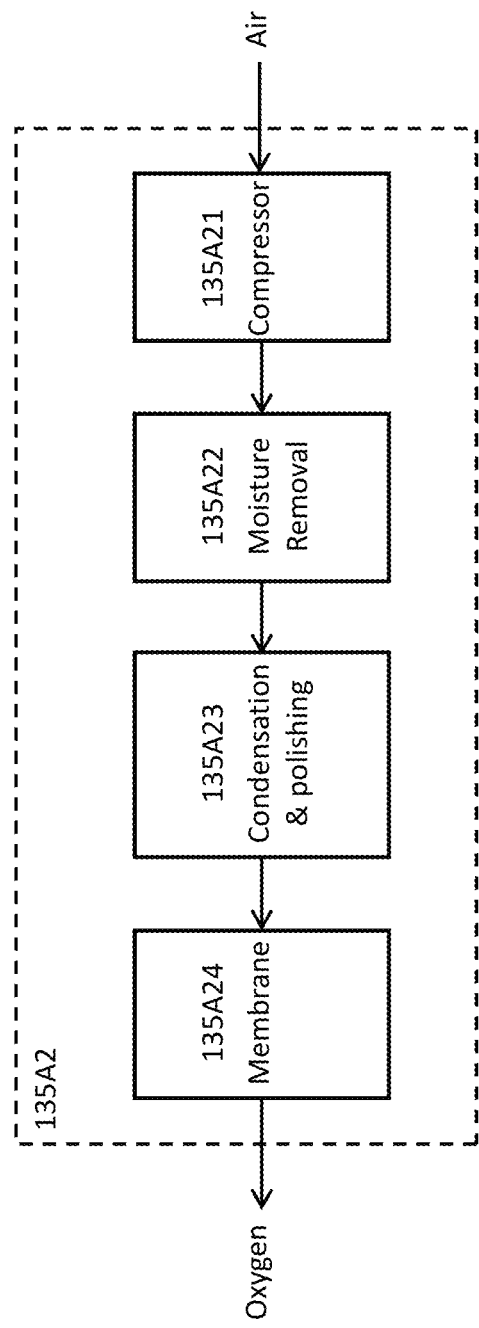
FIG. 6D illustrates details of an oxygen generator, according to an embodiment of the present disclosure, configured to provide oxygen to be injected in the oxygenation loop.

A person skilled in the art would know of various implementations examples of the oxygen generator (135A2) depicted in FIG. 6A, including implementations using an oxygen concentrator and/or a compressor, that intake air and generate substantially pure (e.g., 95%) oxygen therefrom. A preferred exemplary embodiment according to the present disclosure of the oxygen generator (135A2) is shown in FIG. 6D. As can be seen in FIG. 6D, air intake to the oxygen generator (135A2) is provided through a compressor (135A21) which is the driving force that starts the dissolve oxygen process provided by the oxygenation loop (135) of FIGS. 1 and 5A. According to a preferred embodiment of the present disclosure, the compressor (135A21) is an oil-less scroll compressor (also known in the art as a spiral compressor) so to reduce any risk of oil contamination through the oxygenation loop (135). The scroll compressor (135A21) is configured to provide adequate air and pressure for generation of substantially pure oxygen (e.g., about 95%) in quantities enough to sustain a desired concentration of dissolved oxygen in the water (e.g., 10 ppm-50 ppm).

With further reference to FIG. 6D, compressed air from the (scroll) compressor (135A21) is fed to a moisture removal stage (135A22) which is configured to capture and remove any heavy moisture that may disrupt the oxygen generation process in the following stages of the oxygenation loop (135). According to an exemplary embodiment, the moisture removal stage (135A22) may include a heavy moisture tank to contain the captured heavy moisture.

Compressed and heavy moisture free air provided by the stages (135A21, 135A22) of the oxygen generator stage (135A2) depicted in FIG. 6D is fed to a condensation and polishing stage that is configured to remove any oil and/or condensation that may be present in the air, as well as polishing (e.g., filtering) the air, so to provide filtered air, with particles size of less than 3 nano-meters ($10^{-9}$ meters), to an oxygen membrane (135A24). The oxygen membrane (135A24) generates substantially pure oxygen (e.g., about 95%) in quantities enough to sustain a desired concentration of dissolved oxygen in the water (e.g., 10 ppm-50 ppm).

FIG. 7 illustrates details of the conditioner stage (140) and the delivery pump (150) of the self-contained configuration depicted in FIG. 2, which in combination make a water post-treatment stage of the self-contained configuration. The delivery pump (150) delivers nanopurified, oxygen rich water to the outlet for end use based on pressure demand at the outlet. When a built in sensor of the delivery pump (150) senses a drop in pressure at the outlet (coupled to, for example, to home water inlet), a motor of the delivery pump (150) activates to deliver water to the outlet. Water is sent from the holding tank (120), through the conditioner stage (140), to the outlet. According to a preferred embodiment of the present disclosure, the delivery pump (150) may be provided by pump manufacturer Grundfos (Bjerringbro, Denmark).

With continued reference to FIG. 7, according to an embodiment of the present disclosure, the conditioner stage (140) may comprise a remineralizing alkaline media tank (140A) and a post sediment filtration element (140B). The remineralizing alkaline media tank (140A) is configured to add desired minerals to the incoming water from the holding tank (120) and further adjust alkalinity (i.e., pH) level of the delivered water to a level according to end user needs.

As can be seen in FIG. 7, the remineralized and alkaline adjusted water provided by the remineralizing alkaline media tank (140A) is fed to the sediment filtration element (140B) for trapping and filtering out of any fine sediment that my still be in the water, prior to delivery for end use. According to an exemplary embodiment of the present disclosure, the sediment filtration element (140B) may be a sediment filter by manufacturer Enpress LLC (Eastlake, Ohio, USA).

Based on the above description of the functional blocks (110, 115, 120, 130, 135, 140, 150), water delivered by the self-contained configuration of the water system (200) depicted in FIG. 2, is softened, reverse osmosis, nanopurified, oxygen enriched, rose quartz energized, remineralized alkaline water.

Figure 8B:
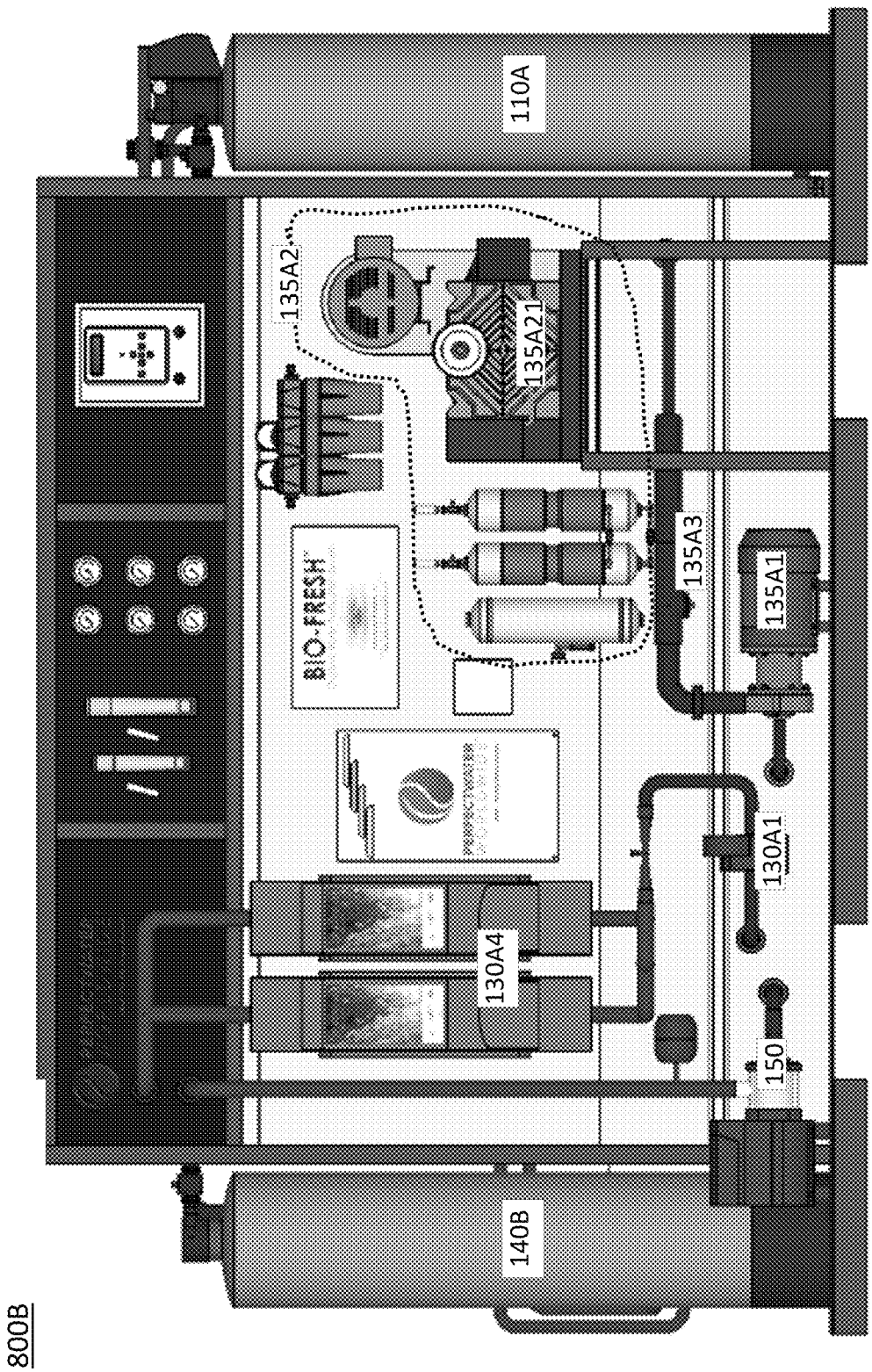
FIG. 8B illustrates an assembly view of the self-contained configuration depicted in FIG. 2 according to a preferred embodiment.

FIG. 8A illustrates two different views of an assembly of the self-contained configuration (200) depicted in FIG. 2 with further details, including exemplary dimensional details. As can be seen in FIG. 8A, a baseplate (810) and a frame structure (830) are used to provide structural rigidity to the assembly. As can be seen in FIG. 8A, a footprint of the self-contained configuration (200) as defined by the baseplate (810) can be provided by a first side of the baseplate (810) being about 117 inches (less than 3.0 meters) and a second side of the baseplate (810) being about 59 inches (less than 1.50 meters). Added safety against electrical hazards is provided via a grounding lug (850). Also shown in FIG. 8A, is a control panel (820) that contains control and/or status elements of the various functional blocks of the self-contained configuration (200). FIG. 8B shows a configuration according to a preferred embodiment of an assembly of the self-contained configuration (200) depicted in FIG. 2, where the oxygen generator (135A2) comprises a scroll compressor (135A21) as discussed above with respect to FIG. 6D.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The invention claimed is:

1. A self-contained water system, comprising:
    a water inlet;
    a water outlet;
    a holding tank;
    a water pre-treatment stage configured to receive water from the water inlet and provide pre-treated water to the holding tank having a total dissolved solids (TDS) of about 4 parts per million (ppm);
    a water sanitizer stage configured to receive the pre-treated water from the holding tank and return temperature controlled sanitized water that is free of living contaminants and bacteria (microorganisms) to the holding tank;
    a water oxygenation stage configured to receive the sanitized water from the holding tank and return oxygenated water to the holding tank, the water oxygenation stage further configured to control a dissolved oxygen concentration of the oxygenated water from a low value equal to 10 ppm, to a high value equal to 50 ppm, and to any value between the low value and the high value; and
    a water post-treatment stage configured, upon detection of a pressure demand at the water outlet, to receive the oxygenated water from the holding tank and provide post-treated water having a desired level of a mineral content to the water outlet.

2. The self-contained water system according to claim 1, wherein the water oxygenation stage is configured to generate voids in the water, at a molecular level, which can be filled with oxygen molecules to provide the high value of the dissolved oxygen concentration.

3. The self-contained water system according to claim 2, wherein the voids are generated through frequencies associated to mechanical vibration of crystal spheres provided along a flow path of the water through the water oxygenation stage.

4. The self-contained water system according to claim 3, wherein the crystal spheres are rose quartz crystal spheres.

5. The self-contained water system according to claim 2, wherein the voids comprise nano-sized voids which can be filled with nano-sized oxygen bubbles having a diameter smaller than 100 nano-meters.

6. The self-contained water system according to claim 3, wherein the water oxygenation stage comprises:
   a high velocity pump that is configured to receive the sanitized water from the holding tank and generate therefrom a high velocity flow of water; and
   a vortexer device configured to:
      a) receive the high velocity flow of water,
      b) receive oxygen,
      c) inject the oxygen in the high velocity flow of water to generate a high velocity flow of oxygen rich water, and
      d) provide a flow path of the high velocity flow of oxygen rich water comprising the crystal spheres.

7. The self-contained water system according to claim 6, wherein the water oxygenation stage further comprises an oxygen generator configured to receive air and generate therefrom 95% pure oxygen, the oxygen generator comprising:
   an oil-less scroll compressor configured to receive the air and output compressed air;
   a moisture removal stage configured to remove heavy moisture from the air;
   a condensation and polishing stage configured to remove, from the compressed air, suspended oil, condensation, and any particle having a size down to 3 nano-meters; and
   an oxygen membrane configured to extract oxygen from the compressed air.

8. The self-contained water system according to claim 1, wherein the water pretreatment stage comprises, in sequence with respect to the water received from the water inlet:
   two filtration tanks operating in parallel, each tank containing media comprising catalytic carbon;
   a sediment filter; and
   a reverse osmosis filter system comprising a pump configured to push water through a membrane of the reverse osmosis filter system,
      wherein the pump of the reverse osmosis filter system is activated according to a detected water level of the holding tank.

9. The self-contained water system according to claim 8, wherein the pump of the reverse osmosis filter system is adapted to fill the holding tank in a time less than 45 minutes for a holding tank capacity substantially equal to 2270 liters.

10. The self-contained water system according to claim 1, wherein the water sanitizer stage comprises, in sequence with respect to the pre-treated water received from the holding tank:
   a circulation pump configured to receive the pre-treated water from the holding tank and push the pre-treated water to the holding tank through stages of the water sanitizer stage at a constant flow velocity;
   an ozonation stage configured to generate ozone ($O_3$) gas;
   a pressure differential injector configured to inject the ozone gas into the water;
   an ultraviolet (UV) treatment stage configured to radiate the water with a high energy UV light; and
   a chiller stage configured to maintain water in the holding tank to a constant low temperature in a range of 8 to 15 degrees Celsius.

11. The self-contained water system according to claim 10, wherein treatment of water through the water sanitizer stage is continuous.

12. The self-contained water system according to claim 10, wherein the pressure differential injector is a Venturi injector.

13. The self-contained water system according to claim 10, wherein the ultraviolet (UV) treatment stage comprises two ultraviolet (UV) treatment quartz vessels operating in parallel, configured to provide the high energy UV light.

14. The self-contained water system according to claim 10, wherein the chiller stage comprises an activated carbon filter stage, comprising coconut carbon, configured to balance a pH level of the water returned to the holding tank.

15. The self-contained water system according to claim 1, wherein the water post-treatment stage comprises, in sequence with respect to the oxygenated water received from the holding tank:
   a delivery pump configured to pull the oxygenated water from the holding tank and push the oxygenated water to the water outlet through stages of the water post-treatment stage upon detection of the pressure demand at the water outlet;
   a remineralization alkaline media tank configured to provide the desired level of the mineral content to the post-treated water and further adjust a pH level of the post-treated water; and
   a sediment filter.

16. The self-contained water system according to claim 1, further comprising a baseplate for mounting of the stages and the holding tank, the baseplate being of a rectangular shape with a length of a first side being less than 3.0 meters, and a length of a second side being less than 1.5 meters, wherein a footprint of the self-contained water system is represented by the baseplate.

17. The self-contained water system according to claim 1, wherein the holding tank is of a symmetrical shape and has a width, a height and a depth, and wherein a capacity of the holding tank is substantially equal to 2270 liters.

18. The self-contained water system according to claim 17, wherein lengths of at least one of: a) the height and the width, and b) the height and the depth, are bound by a Golden Ratio.

19. A method for water treatment, the method comprising:
   feeding water from an inlet to a water pre-treatment stage configured to receive water from the water inlet and provide pre-treated water to a holding tank having a total dissolved solids (TDS) of about 4 parts per million (ppm);
   circulating the pre-treated water from the holding tank through a water sanitizer stage configured to receive water from the holding tank and return temperature controlled sanitized water to the holding tank;
   circulating the sanitized water from the holding tank through a water oxygenation stage configured to receive the sanitized water from the holding tank and return oxygenated water to the holding tank, the water oxygenation stage further configured to control a dissolved oxygen concentration of the oxygenated water from a low value equal to 10 ppm, to a high value equal to 50 ppm, and to any value between the low value and the high value; and upon detection of a pressure demand at a water outlet, feeding the oxygenated water from the holding tank to the outlet through a water post-treatment stage that is configured to post-treat the oxygenated water to provide a mineral content according to a desired level to the oxygenated water.

20. The method according to claim 19, wherein provision of the oxygenated water by the water oxygenation stage comprises generation of oxygen via an oil-less scroll compressor.

* * * * *